(12) United States Patent
Bendapudi et al.

(10) Patent No.: US 7,523,469 B2
(45) Date of Patent: *Apr. 21, 2009

(54) ENABLING INTER-SUBSYSTEM RESOURCE SHARING

(75) Inventors: Perraju Bendapudi, Hyderabad (IN); Kiran Akella Venkata, Redmond, WA (US); Amit Kumar Ghosh, Kolkata (IN)

(73) Assignee: Microsoft Corporation, Redmond, WA (US)

( * ) Notice: Subject to any disclaimer, the term of this patent is extended or adjusted under 35 U.S.C. 154(b) by 494 days.

This patent is subject to a terminal disclaimer.

(21) Appl. No.: 11/004,608

(22) Filed: Dec. 3, 2004

(65) Prior Publication Data

US 2006/0123432 A1 Jun. 8, 2006

(51) Int. Cl.
*G06F 3/00* (2006.01)
*G06F 12/00* (2006.01)

(52) U.S. Cl. .................. 719/328; 719/312; 719/330; 711/202

(58) Field of Classification Search ............... 719/330, 719/331, 328, 312; 711/202
See application file for complete search history.

(56) References Cited

U.S. PATENT DOCUMENTS

| | | | |
|---|---|---|---|
| 5,423,042 A * | 6/1995 | Jalili et al. | 719/328 |
| 6,192,418 B1 * | 2/2001 | Hale et al. | 719/312 |
| 6,601,110 B2 * | 7/2003 | Marsland | 719/310 |
| 6,604,123 B1 * | 8/2003 | Bruno et al. | 718/100 |
| 2006/0168588 A1 | 7/2006 | Bendapudi | |

* cited by examiner

*Primary Examiner*—Lechi Truong
(74) *Attorney, Agent, or Firm*—Perkins Coie LLP (57) ABSTRACT

Techniques for enabling inter-subsystem resource sharing are provided. The techniques include providing an RPC client on a first subsystem for acting as a proxy for a resource of a second subsystem. When the first subsystem receives a request from an application to access the resource, the RPC client may invoke a function of an RPC server associated with the second subsystem. The RPC server may load the resource on the second subsystem. The RPC client may then act as a proxy for the resource.

19 Claims, 5 Drawing Sheets

| Memory Locations | | | |
|---|---|---|---|
| WINDOWS | POSIX | Subsystem X | ... |
| 0x01234567 | 0x76543210 | 0x98006412 | |
| 0x01234599 | 0x765432FF | 0xF1234567 | |
| ... | ... | ... | |

ENABLING INTER-SUBSYSTEM RESOURCE SHARING

TECHNICAL FIELD

The described technology relates generally to operating systems and, more particularly, to enabling inter-subsystem resource sharing.

BACKGROUND

An operating system performs various tasks relating to a computer system, including managing its hardware and software resources. Hardware resources include processors, primary storage (e.g., memory), secondary storage (e.g., hard disk or optical disk), printers, display adapters, network interface cards, input/output ports, etc. Software resources include application programs, user interfaces, device drivers, network protocol stacks, etc. The operating system manages and coordinates these resources to complete various tasks, such as under the direction of an application program.

Operating systems may provide functionality to application programs using subsystems. A subsystem is an operating system component that implements an operating system's application program interfaces ("APIs"). Subsystems may invoke functions of a kernel component. A kernel component is an operating system component that provides core operating system functions.

An operating system may comprise multiple subsystems, each exposing different operating system behaviors. As an example, an operating system may implement a portable operating system interface ("POSIX") and a MICROSOFT WINDOWS interface as two separate subsystems. These subsystems may both function on a common operating system. Such an operating system may function both with applications designed for POSIX and applications designed for MICROSOFT WINDOWS.

However, applications designed for one subsystem may not share resources designed for another subsystem. As an example, a POSIX application may be unable to load a dynamic link library ("DLL") designed for MICROSOFT WINDOWS. Similarly, a MICROSOFT WINDOWS application may be unable to load a DLL designed for POSIX. To enable a DLL designed for a subsystem to function with another subsystem, a developer could rebuild the DLL for the other subsystem. However, rebuilding a DLL may require source code relating to the DLL. The source code may be unavailable when, e.g., the DLL is provided by a software vendor.

As an example, a customer having a UNIX-based application may wish to make the application function with MICROSOFT WINDOWS. This application may have a portion developed by the customer and a portion provided by a software vendor, such as a database software vendor. The customer could then move the portion it developed to POSIX as an intermediate step to moving its applications to MICROSOFT WINDOWS. However, although the software vendor may make available its portion for MICROSOFT WINDOWS as a DLL, it may not make its portion available for POSIX. Because the POSIX portion of the customer's application cannot use the software vendor's DLL designed for MICROSOFT WINDOWS, the customer's application may not fully function with the POSIX subsystem. The customer may thus be less inclined to move its applications to MICROSOFT WINDOWS. It would thus be highly desirable to enable inter-subsystem resource sharing

DETAILED DESCRIPTION

Techniques for enabling inter-subsystem resource sharing are provided. In various embodiments, a subsystem executing an application ("app subsystem") receives resources from another subsystem providing a resource ("resource subsystem"), such as a DLL. A remote procedure call ("RPC") client is associated with the app subsystem. The RPC client may be built with reference to a header file used to define an interface for the resource. The RPC client may act as a proxy for the resource. The RPC client receives an indication from the application to access the resource, such as to invoke a method of a DLL. The RPC client then invokes, via a RPC, a method provided by a RPC server that is associated with the resource subsystem. The method provided by the RPC server then accesses the resource, such as by loading a DLL and invoking a method of the DLL.

Because the RPC client and the RPC server may be operating in different processes, they may need a mechanism to exchange contents of memory locations. As an example, when the RPC client calls the RPC server, it may need to provide parameters (e.g., arguments) to a method of the DLL that is being invoked. A parameter may refer to a memory location associated with the app subsystem, such as a memory region used by the application. However, the memory location may be invalid in the resource subsystem or may not contain the same information as the memory location associated with the app subsystem. Furthermore, when the resource provides results, these results may be loaded into memory associated with the resource subsystem, such as a memory region used by the DLL. These results may then need to be furnished to the application by the app subsystem. The RPC client and the RPC server thus may synchronize memory so that contents of memory can be accessed by both subsystems and their corresponding components. When synchronizing memory, a table of memory addresses may be referenced. The table comprises a list of corresponding memory locations associated with the subsystems. As an example, the table may indicate that a memory location A in the app subsystem can be found at memory location B associated with the resource subsystem. By synchronizing memory, the application and the resource may exchange parameters, results, and indeed any memory content.

Figure 1:
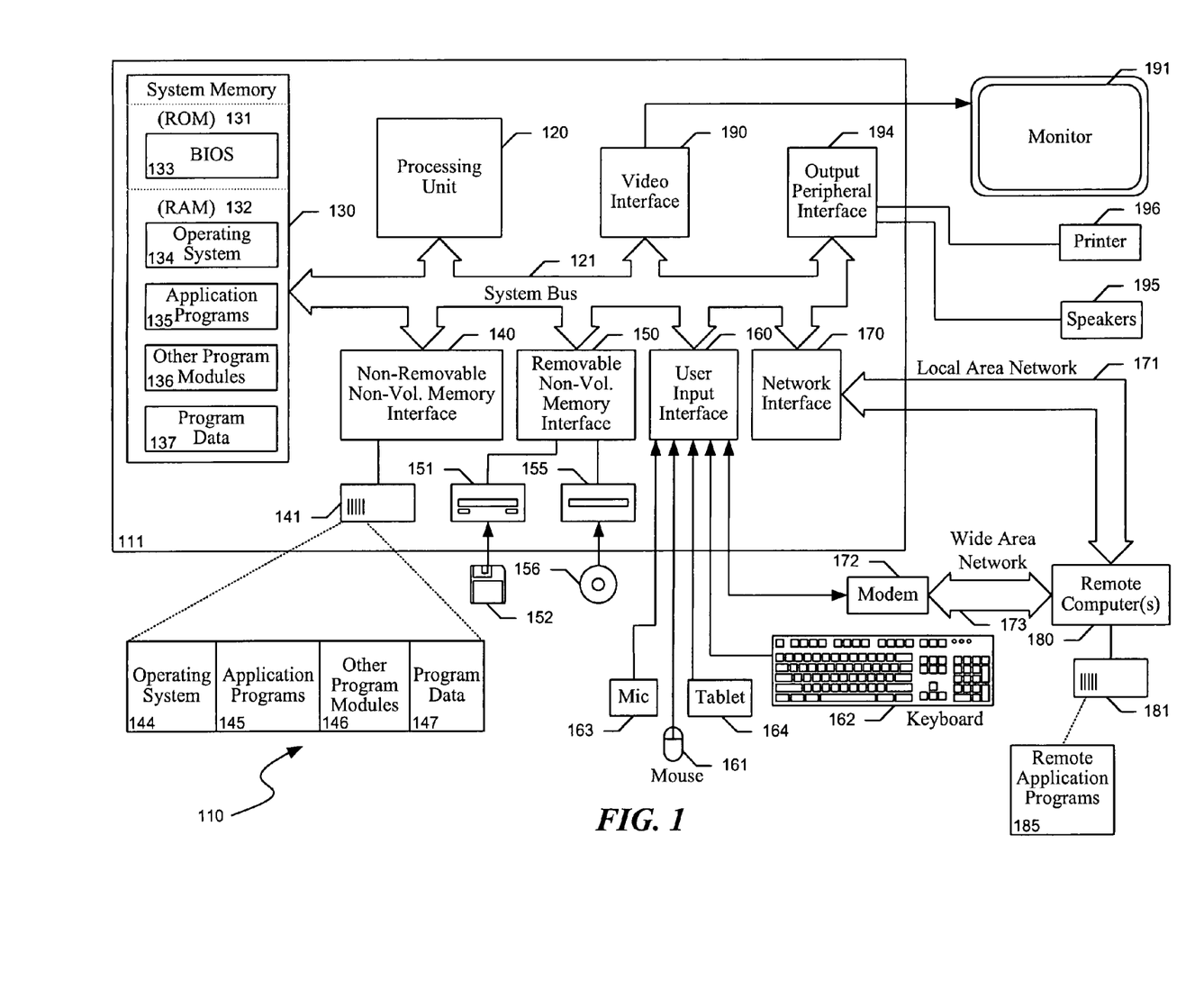
FIG. 1 is a block diagram illustrating an example of a suitable computing environment in which the techniques may be implemented.

Turning now to the figures, FIG. 1 illustrates an example of a suitable computing system environment 110 or operating environment in which the techniques or facility may be implemented. The computing system environment 110 is only one example of a suitable computing environment and is not intended to suggest any limitation as to the scope of use or functionality of the facility. Neither should the computing system environment 110 be interpreted as having any dependency or requirement relating to any one or a combination of components illustrated in the exemplary operating environment 110.

The facility is operational with numerous other general purpose or special purpose computing system environments or configurations. Examples of well-known computing systems, environments, and/or configurations that may be suitable for use with the facility include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The facility may be described in the general context of computer-executable instructions, such as program modules, being executed by a computer. Generally, program modules include routines, programs, objects, components, data structures, and so forth that perform particular tasks or implement particular abstract data types. The facility may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the facility includes a general purpose computing device in the form of a computer 111. Components of the computer 111 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 111 typically includes a variety of computer-readable media. Computer-readable media can be any available media that can be accessed by the computer 111 and includes both volatile and nonvolatile media and removable and nonremovable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 111. Communication media typically embody computer-readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within the computer 111, such as during start-up, is typically stored in ROM 131. RAM 132 typically contains data and/or program modules that are immediately accessible to and/or presently being operated on by the processing unit 120. By way of example, and not limitation, FIG. 1 illustrates operating system 134, application programs 135, other program modules 136 and program data 137.

The computer 111 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a nonremovable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 111. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 111 through input devices such as a tablet or electronic digitizer 164, a microphone 163, a keyboard 162 and pointing device 161, commonly referred to as a mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus 121, but may be connected by other interface and bus structures, such as a parallel port, game port, or a universal serial bus (USB). A monitor 191 or other type of display device is also connected to the system bus 121 via an interface, such as a video interface 190. The monitor 191 may also be integrated with a touch-screen panel or the like. Note that the monitor 191 and/or touch screen panel can be physically coupled to a housing in which the computer 111 is incorporated, such as in a tablet-type personal computer. In addition, computing devices such as the computer 111 may also include other peripheral output devices such as speakers 195 and printer 196, which may be connected through an output peripheral interface 194 or the like.

The computer 111 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 111, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprisewide computer networks, intranets and the Internet. For example, in the present facility, the computer 111 may comprise the source machine from which data is being migrated, and the remote computer 180 may comprise the destination machine. Note, however, that source and destination machines need not be connected by a network or any other means, but instead, data may be migrated via any media capable of being written by the source platform and read by the destination platform or platforms.

When used in a LAN networking environment, the computer 111 is connected to the LAN 171 through a network interface or adapter 170. When used in a WAN networking environment, the computer 111 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 111, or portions thereof, may be stored in the remote memory storage device 181. By way of example, and not limitation, FIG. 1 illustrates remote application programs 185 as residing on memory storage device 181. It will be appreciated that the network connections shown are exemplary and other means of establishing a communications link between the computers may be used.

While various functionalities and data are shown in FIG. 1 as residing on particular computer systems that are arranged in a particular way, those skilled in the art will appreciate that such functionalities and data may be distributed in various other ways across computer systems in different arrangements. While computer systems configured as described above are typically used to support the operation of the facility, one of ordinary skill in the art will appreciate that the facility may be implemented using devices of various types and configurations, and having various components.

The techniques may be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Figure 2:
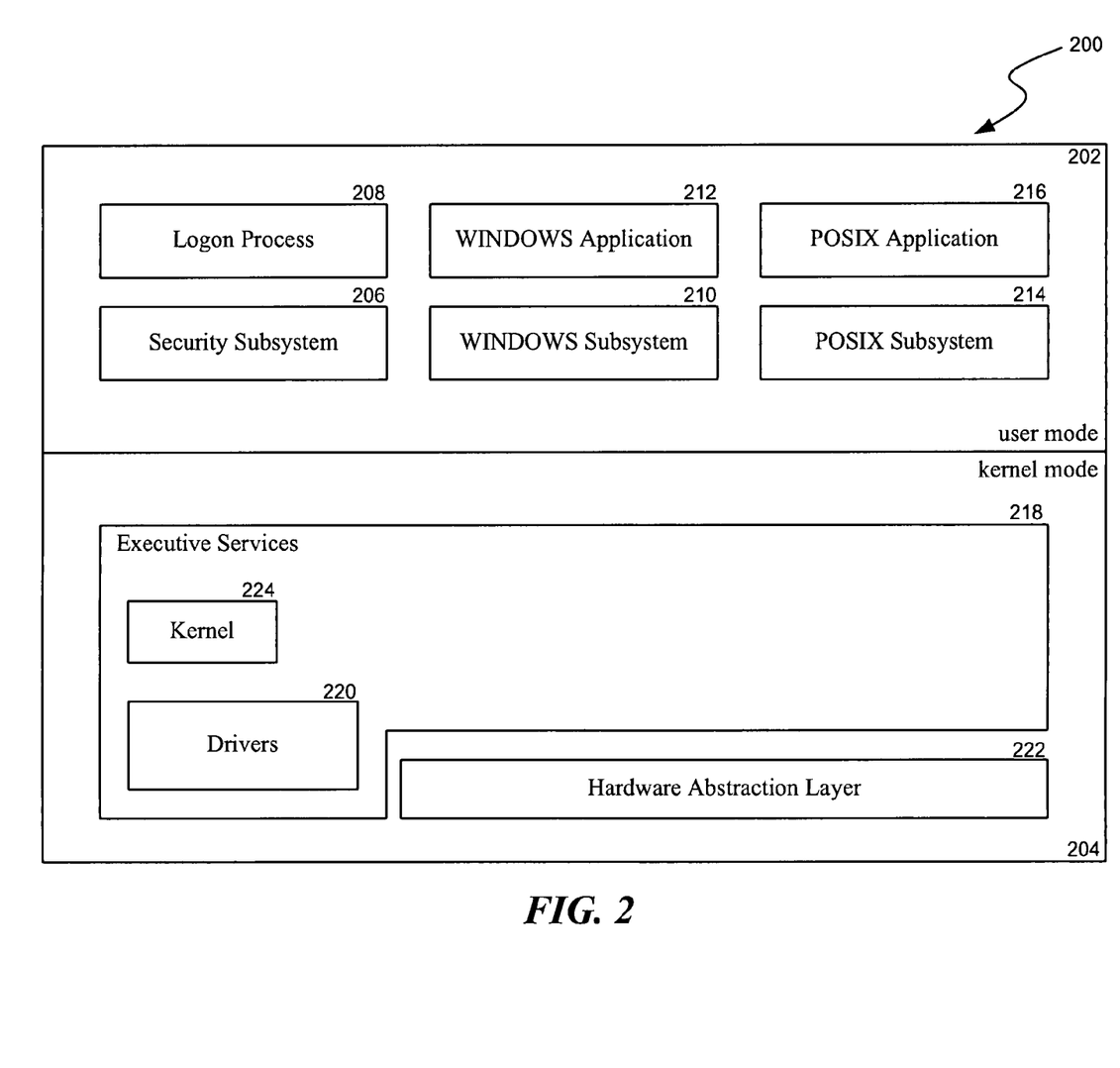
FIG. 2 is a block diagram illustrating components of an operating system.

FIG. 2 is a block diagram illustrating components of an operating system. The operating system 200 comprises multiple components operating in a user mode 202 and a kernel mode 204.

Components operating in a user mode include, e.g., a security subsystem 206, logon process 208, WINDOWS subsystem 210, WINDOWS application 212, POSIX subsystem 214, and POSIX application 216.

The security subsystem provides security services to applications and the operating system. As an example, the security subsystem may provide a logon process 208 and functionality to enable users to log on to the operating system.

The WINDOWS subsystem may provide MICROSOFT WINDOWS functionality to applications, such as WINDOWS applications. The WINDOWS subsystem may implement an application program interface relating to the MICROSOFT WINDOWS operating system. As an example, the WINDOWS subsystem may receive a request made by a WINDOWS application to an API of the WINDOWS subsystem, perform some activities relating to the request, and call an operating system kernel to perform remaining activities.

The operating system may also have additional subsystems, such as a POSIX subsystem 214. The POSIX subsystem may implement an API relating to an operating system that complies with a POSIX specification. The API may be used by a POSIX application 216 to communicate with the POSIX operating system to perform tasks.

When an operating system comprises multiple subsystems, it is capable of providing multiple varieties of operating systems, such as MICROSOFT WINDOWS and POSIX. Thus, applications designed for these varieties of operating systems may function on the operating system comprising multiple subsystems.

The subsystems may utilize services provided by an executive services component 218 operating in kernel mode 204. The executive services component may comprise additional components, such as drivers 220 and a kernel 224. The drivers may provide direct communications between various software and hardware components of the system. As an example, a driver may provide communications between software components and a network interface card. The kernel may provide core operating system functions and communications with a processor. As an example, the kernel may schedule thread execution by loading program registers and instructing the processor to begin executing a thread. A hardware abstraction layer 222 may also operate in kernel mode to provide operating system components and interfaces relating to hardware devices. The hardware abstraction layer may enable software components of the operating system to avoid having to provide functionality specific to a particular vendor's hardware device.

Although applications are shown as a part of the operating system, they may execute by utilizing various facilities provided by the operating system, as illustrated in FIG. 1.

Figure 3:
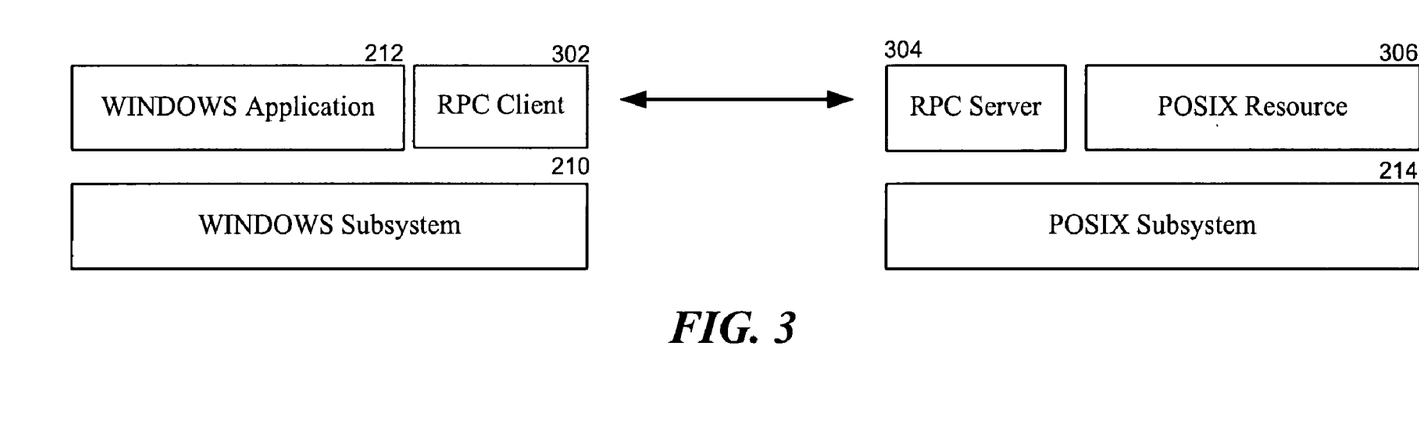
FIGS. 3-5 are block diagrams illustrating components for enabling inter-subsystem resource sharing in various embodiments.

FIG. 3 is a block diagram illustrating components for enabling inter-subsystem resource sharing in an embodiment. The operating system of FIG. 2 additionally comprises an RPC client 302, RPC server 304, and POSIX resource 306.

RPC is a programming model that implements communications between components. Typically, RPC is used between clients and servers in distributed computing architectures in which a client may need to cause a server to perform an action. When this is the case, a client component sends a request message to a server component indicating to execute a method, and may provide parameters to the method. The server may then respond with a message that contains a result from the indicated method.

In the applicants' technique, RPC clients and servers may be associated with subsystems, both on the same computing system. In various embodiments, the RPC client and server may be closely coupled with subsystems. As an example, the subsystems may provide built-in RPC functionality. Alternatively, as in the illustrated embodiment, the RPC client may be available as a library, such as a DLL. In various embodiments, the RPC client may be embedded into a DLL corresponding to the DLL of the resource subsystem ("proxy DLL"). The proxy DLL may expose an interface that is similar, if not identical, to an interface exposed by the resource. The proxy DLL may be built with reference to a header file of the resource. This header file may define the interface exposed by the resource. The proxy DLL may implement the interface by sending a message to an RPC server associated with the resource subsystem. The message may comprise an indication of an invoked method of the interface and parameters relating to the invoked method. When an application invokes a method of the proxy DLL, the proxy DLL may send a message to the RPC server with the indication of the invoked method and any parameters provided by the application.

The RPC server may be a service associated with the resource subsystem. A service is typically a component that provides services to other applications. Services are sometimes referred to as daemons. Services are generally used to perform various tasks relating to an operating system without user input, such as responding to network requests, hardware activity, or requests from applications and other software components. Upon receiving a message from the RPC client, the RPC server may load the resource, invoke a method indicated in the message, and provide to the invoked method any parameters received in the message. When the resource provides a result, the RPC server may return a message to the RPC client containing an indication of the result.

Using these components, a WINDOWS application may be able to utilize a resource associated with the POSIX subsystem. In the illustrated embodiment, the RPC client is associated with the WINDOWS subsystem, and the RPC server is associated with the POSIX subsystem. When a WINDOWS application attempts to load a resource that is associated with the POSIX subsystem, the application may load the RPC client that serves as a proxy for the resource. Then, when the WINDOWS application invokes a method of the resource, the RPC client may send a request to the RPC server indicating to invoke the method. The message to the RPC server may contain an indication of any parameters provided by the application to the RPC client. The RPC server may then load the POSIX resource on the POSIX subsystem and invoke the indicated method, and may provide the parameters the RPC server received from the RPC client. When the invoked method completes, the RPC server may provide the results to the RPC client, which in turn may provide the results to the application.

In various embodiments, a synchronization component (not shown) may synchronize memory between the RPC client and the RPC server. The synchronization may be performed, e.g., to facilitate sharing of information contained in memory locations or regions of applications, resources, subsystems, and so on. As an example, contents of memory may need to be provided to the RPC server relating to parameters to invoked methods, or to the RPC client relating to results from the invoked methods. Various techniques may be used to synchronize memory. As an example, messages may be exchanged between the RPC client and the RPC server containing values to be synchronized or contents of memory to be provided to components.

Figure 4:
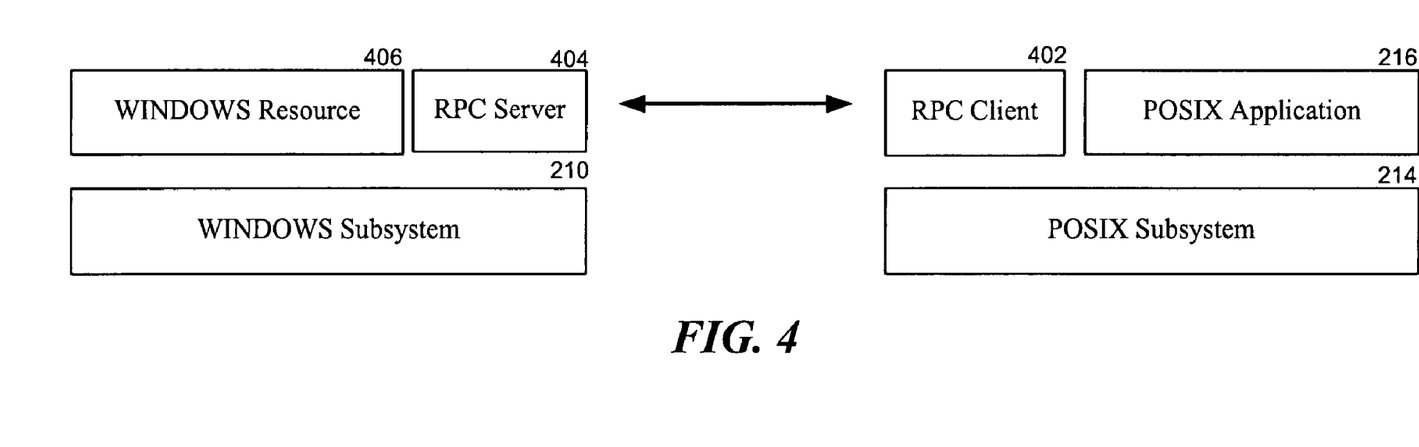

FIG. 4 is a block diagram illustrating components for enabling inter-subsystem resource sharing in an embodiment. The operating system of FIG. 2 additionally comprises an RPC client 402, RPC server 404, and WINDOWS resource 406, such as a DLL. These components may perform activities similar to those described above in relation to FIG. 3. However, the application and the RPC client may be running on the POSIX subsystem and the resource and RPC server may be associated with the WINDOWS subsystem. Thus, a POSIX application may be able to utilize a resource associated with the WINDOWS subsystem.

Figure 5:
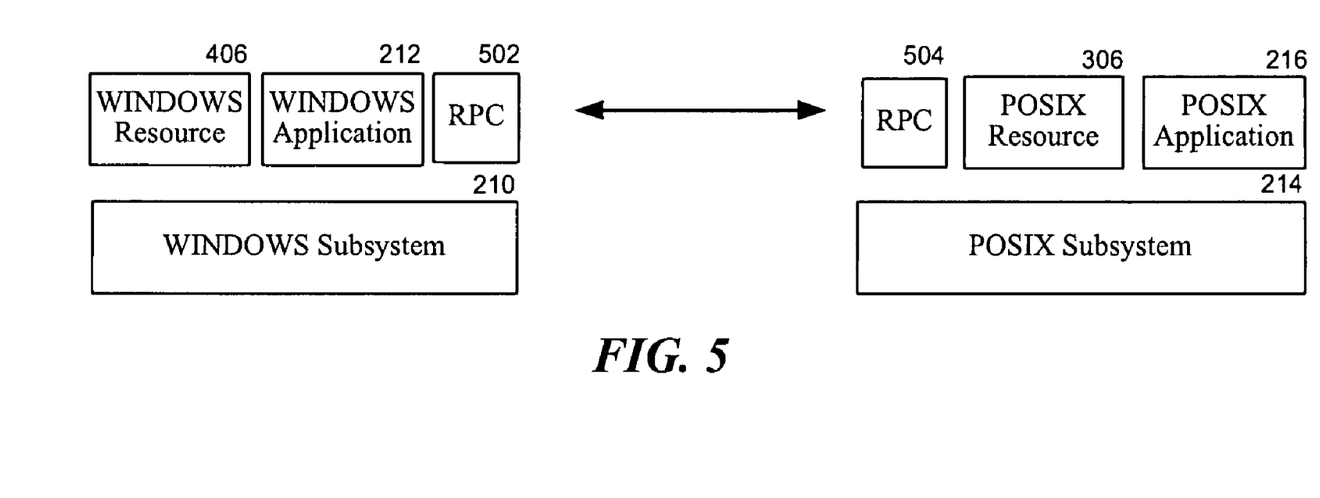

FIG. 5 is a block diagram illustrating components for enabling inter-subsystem resource sharing in an embodiment. The operating system of FIG. 2 additionally comprises a WINDOWS resource 406, POSIX resource 306, and RPC components 502 and 504.

The WINDOWS and POSIX resources may be DLLs or other resources associated with their respective subsystems that may need to be utilized by an application of another subsystem. As an example, the WINDOWS application 212 may need to utilize the POSIX resource 306. Similarly, the POSIX application 216 may need to utilize the WINDOWS resource 406.

RPC components 502 and 504 may act as clients, servers, or both. In various embodiments, the client and server functionalities may be divided into separate subcomponents or altogether different components, such as those illustrated in FIGS. 3 and 4.

Figure 6:
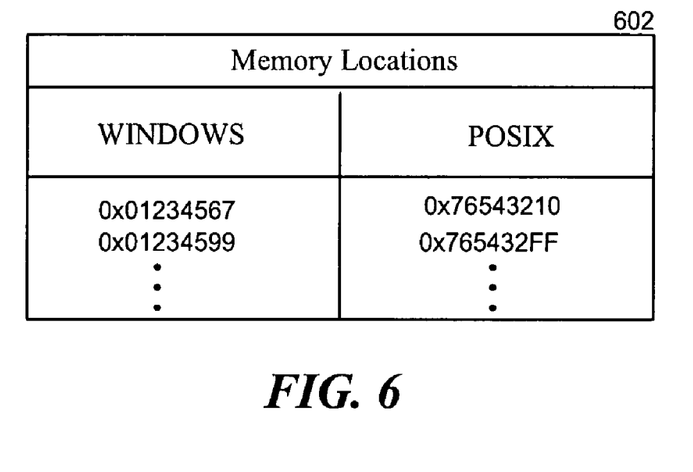
FIGS. 6-7 are block diagrams illustrating tables for listing corresponding memory locations in various embodiments.

FIG. 6 is a block diagram illustrating a table for listing corresponding memory locations in an embodiment. The table 602 comprises two columns: A WINDOWS column and a POSIX column. Each row in the table indicates a memory location for each of the columns. The contents of each cell of the table may indicate a memory location corresponding to a component of a subsystem associated with the column. In the illustrated example, memory location 0X01234567 associated with a component of the WINDOWS subsystem (e.g., a resource) corresponds to memory location 0X76543210 associated with a component of the POSIX subsystem (e.g., an application). In various embodiments, memory regions may be indicated instead of individual memory locations. A memory region may include multiple memory locations, whether or not adjacently located.

Components of the applicants' technique, e.g., the RPC client, RPC server, or synchronization component may utilize the table to determine from which location to read memory or to which location to write contents for memory. As an example, when a parameter is provided by a POSIX application to a WINDOWS resource, these components may determine that an object referenced by memory location 0X76543210 in the POSIX subsystem can be found at 0X01234567 in the WINDOWS subsystem.

A synchronization component may use the table to determine from which memory locations to read information, and to which memory locations to write information. The synchronization component, RPC client, or RPC server may also add or remove rows from the table. As an example, the RPC client may add a row when a parameter is provided, and the RPC server may add a row when a result is returned. Similarly, the RPC client may remove a row when the invoked method returns.

Figure 7:
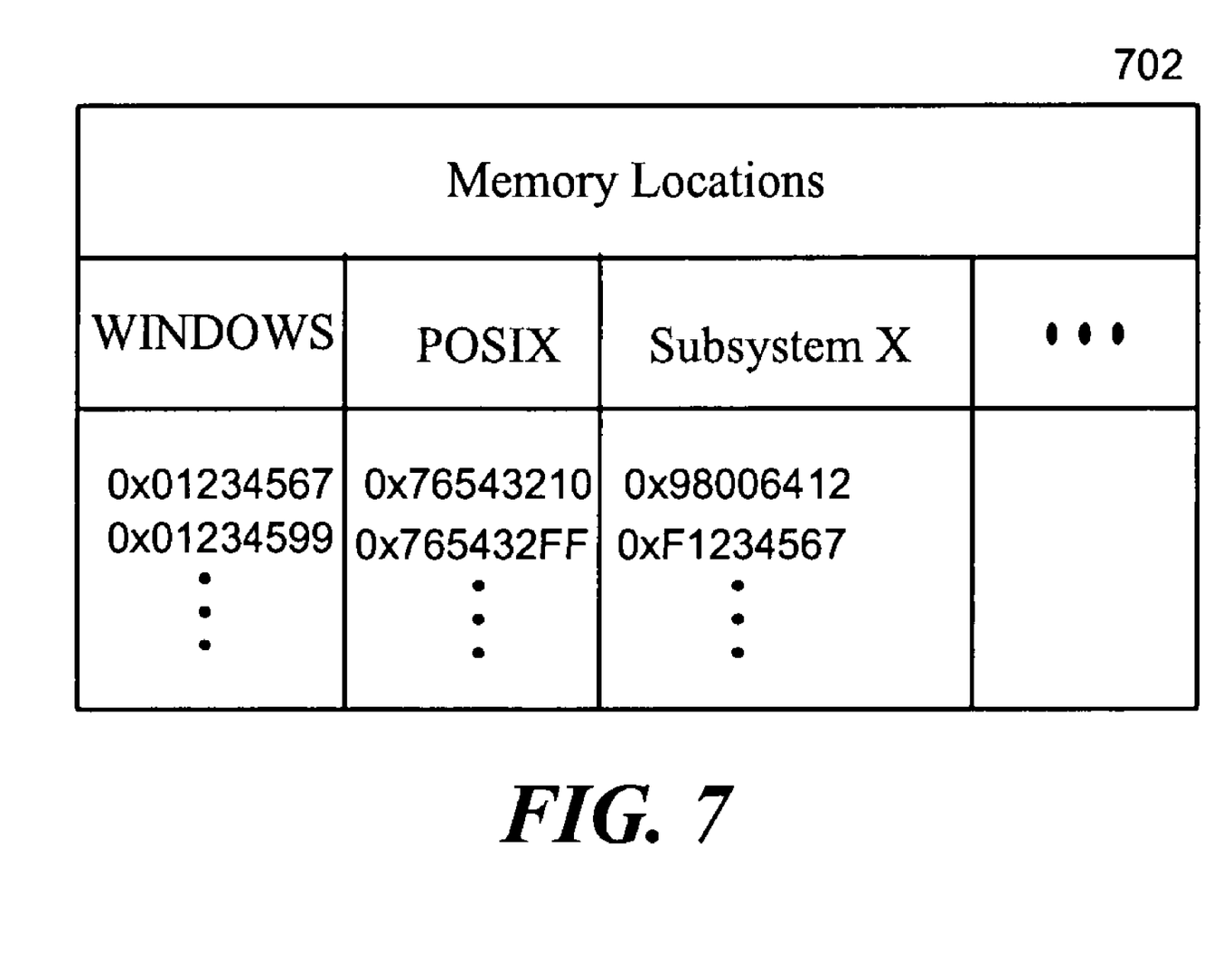

FIG. 7 is a block diagram illustrating a table for listing corresponding memory locations in an embodiment. The table comprises multiple columns. Each column relates to a subsystem. In the illustrated embodiment, memory locations are indicated for a WINDOWS subsystem, POSIX subsystem, and a "subsystem X." Thus, various components may reference the table to determine into which memory locations values should be written or from which memory locations values should be read. In various embodiments, memory regions may be indicated by the table's cells instead of, or in addition to, memory locations.

In various embodiments, the tables of FIGS. 6 and 7 may include additional columns or additional information. As examples, the tables may indicate a memory region by providing a starting memory address and either a length or an ending memory address.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A system for enabling inter-subsystem resource sharing, comprising:
    a processor and memory;
    a remote procedure call client component of a first subsystem of an operating system that receives a request from an application to access a resource of a second subsystem of the operating system, the remote procedure call client component providing a proxy for the resource and sending a request to an associated remote procedure call server component to provide access, wherein the remote procedure call client component and the associated remote procedure call server component execute on the same CPU, the remote procedure call server component associated with the second subsystem of the operating system, wherein the first subsystem is different from the second subsystem;
    a synchronization component that, upon determining that a result relating to the request is available in a memory region accessible by the remote procedure call server component of the second subsystem of the operating system, synchronizes the memory region accessible by the remote procedure call server component with a corresponding memory region accessible by the remote procedure call client component to make the result available to the application that requested access to the resource; and
    the synchronization component that, upon determining that a parameter referencing a memory region of the remote procedure call client component is to be made available at the remote procedure call server component of the second subsystem of the operating system, synchronizes the memory region of the remote procedure call client component with a corresponding memory region of the remote procedure call server component to make the parameter available to the resource, the parameter provided by the remote procedure call client component when invoking a function of the remote procedure call server component;
    wherein the synchronization component employs one or more data structures by adding and removing data in the one or more data structures to determine the corresponding memory regions.

2. The system of claim 1 wherein the result is available when the remote procedure call server component indicates to the remote procedure call client component that the result is available.

3. The system of claim 1 wherein the first subsystem of the operating system is MICROSOFT WINDOWS.

4. The system of claim 3 wherein the second subsystem of the operating system complies with a portable operating system interface specification.

5. The system of claim 1 wherein the first subsystem of the operating system complies with a portable operating system interface specification.

6. The system of claim 5 wherein the second subsystem of the operating system is MICROSOFT WINDOWS.

7. The system of claim 1 wherein the data structure is a table.

8. A method performed by a computer executing a subsystem for enabling inter-subsystem resource sharing, comprising:
    providing a remote procedure call client component on a first subsystem of an operating system, the remote procedure call client component acting as a proxy for a resource of a second subsystem of the operating system;
    receiving a request from an application to access the resource;
    calling a function of a remote procedure call server component of the second subsystem for accessing the resource on the second subsystem, wherein the remote procedure call client component and the remote procedure call server component execute on the same CPU, wherein the first subsystem is different from the second subsystem;
    upon determining that a result relating to the request is available in a memory region accessible by the remote procedure call server component, synchronizing a memory region accessible by the remote procedure call server component with a corresponding memory region accessible by the remote procedure call client component to make the result available to the application that requested access to the resource; and
    upon determining that a parameter referencing a memory region of the remote procedure call client component is to be made available at the remote procedure call server component, synchronizing the memory region of the remote procedure call client component with a corresponding memory region accessible by the remote procedure call server component to make the parameter available to the resource, the parameter provided by the remote procedure call client component when invoking a function of the remote procedure call server component;
    wherein a synchronization component employs one or more data structures by adding and removing data in the one or more data structures to determine the corresponding memory regions.

9. The method of claim 8 wherein the accessing includes loading a dynamic link library.

10. The method of claim 9 wherein the accessing includes invoking a method of the dynamic link library.

11. The method of claim 9 wherein the first subsystem is MICROSOFT WINDOWS.

12. The method of claim 11 wherein the second subsystem complies with a portable operating system interface specification.

13. The method of claim 9 wherein the first subsystem complies with a portable operating system interface specification.

14. The method of claim 13 wherein the second subsystem is MICROSOFT WINDOWS.

15. A computer-readable storage medium storing computer-executable instructions that, when executed by a processor, perform a method for enabling inter-subsystem resource sharing, comprising:
    providing a remote procedure call client component on a first subsystem of an operating system, the remote procedure call client component acting as a proxy for a resource of a second subsystem of the operating system;
    receiving a request from an application to access the resource;
    calling a function of a remote procedure call server component of the second subsystem for accessing the resource on the second subsystem, wherein the remote procedure call client component and the remote procedure call server component execute on the same CPU, wherein the first subsystem is different from the second subsystem;

upon determining that a result relating to the request is available in a memory region accessible by the remote procedure call server component, synchronizing a memory region accessible by the remote procedure call server with a corresponding memory region accessible by the remote procedure call client component to make the result available to the application that requested access to the resource; and upon determining that a parameter referencing a memory region of the remote procedure call client component is to be made available at the remote procedure call server component, synchronizing the memory region of the remote procedure call client component with a corresponding memory region accessible by the remote procedure call server component to make the parameter available to the resource, the parameter provided by the remote procedure call client component when invoking a function of the remote procedure call server component;

wherein a synchronization component employs one or more data structures by adding and removing data in the one or more data structures to determine the corresponding memory regions.

16. The computer-readable storage medium of claim 15 wherein the first subsystem is MICROSOFT WINDOWS.

17. The computer-readable storage medium of claim 16 wherein the second subsystem complies with a portable operating system interface specification.

18. The computer-readable storage medium of claim 15 wherein the first subsystem complies with a portable operating system interface specification.

19. The computer-readable storage medium of claim 18 wherein the second subsystem is MICROSOFT WINDOWS.

* * * * *